US009552361B2

(12) United States Patent
Parekh et al.

(10) Patent No.: US 9,552,361 B2
(45) Date of Patent: Jan. 24, 2017

(54) METHOD AND SYSTEM FOR PREFETCHING MUSIC FOR DEVICES

(71) Applicant: Google Inc., Mountain View, CA (US)

(72) Inventors: Neel B. Parekh, Sunnyvale, CA (US); Dmitry Dolinsky, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/665,998

(22) Filed: Mar. 23, 2015

(65) Prior Publication Data

US 2015/0193458 A1 Jul. 9, 2015

Related U.S. Application Data

(63) Continuation of application No. 13/649,059, filed on Oct. 10, 2012, now Pat. No. 8,990,203.

(51) Int. Cl.
*G06F 17/30* (2006.01)

(52) U.S. Cl.
CPC ... *G06F 17/30106* (2013.01); *G06F 17/30132* (2013.01); *G06F 17/30749* (2013.01)

(58) Field of Classification Search
None
See application file for complete search history.

(56) References Cited

U.S. PATENT DOCUMENTS

| 8,229,856 | B1 | 7/2012 | Reddick |
| 8,326,221 | B2 | 12/2012 | Dorsey |
| 2004/0138948 | A1 | 7/2004 | Loomis |
| 2005/0098023 | A1 | 5/2005 | Toivonen et al. |
| 2007/0106672 | A1 | 5/2007 | Sighart et al. |
| 2007/0220552 | A1 | 9/2007 | Juster et al. |
| 2009/0003125 | A1 | 1/2009 | Kusaka et al. |
| 2009/0288016 | A1* | 11/2009 | Bilman ............ G06F 17/30899 715/748 |
| 2009/0292819 | A1 | 11/2009 | Kandekar et al. |
| 2010/0011119 | A1 | 1/2010 | Knowlton et al. |
| 2010/0198767 | A1 | 8/2010 | Farrelly |
| 2011/0040718 | A1 | 2/2011 | Tendjoukian et al. |

(Continued)

OTHER PUBLICATIONS

Extended European Search Report for EP 13186528.9, dated Feb. 18, 2014.

(Continued)

*Primary Examiner* — Hung Q Pham
(74) *Attorney, Agent, or Firm* — Morris & Kamlay LLP

(57) ABSTRACT

Methods and systems are presented for prefetching music for devices. The disclosed method includes detecting an access to a music library through a device. The music library is associated with a user music account and is managed in cloud music storage. The disclose method further includes monitoring use activities for the user music account and the use activities of selected songs in the music library are adjustable for relevance based on assigned weightings. One or more songs from the music library that satisfy a prefetching constraint based on the monitored use activities are identified. The songs that satisfy the prefetching constraint are tagged for transferring to the device. The tagged songs are transferred to the device without receiving a user initiated request for the tagged songs.

16 Claims, 10 Drawing Sheets

(56) References Cited

U.S. PATENT DOCUMENTS

| | | |
|---|---|---|
| 2011/0113051 A1 | 5/2011 | Lindahl et al. |
| 2011/0118858 A1 | 5/2011 | Rottler et al. |
| 2012/0278331 A1 | 11/2012 | Campbell et al. |
| 2013/0054472 A1 | 2/2013 | Clark |
| 2013/0085586 A1 | 4/2013 | Parekh |

OTHER PUBLICATIONS

Kreitz, et al., "Spotify—Large Scale, Low Latency, P2P Music-on-Demand Streaming", P2P Music-on-Demand Streaming, Peer-To-Peer Computing (P2P), 2010 IEEE Tenth International Conference On, Aug. 25, 2010 (Aug. 25, 2010), pp. 1-18, XP831752215, IEEE, Piscataway, NJ, USA.

McNulty, "The Kindle Fire PocketGuide", (Peachpit Pocket Guide), Jan. 16, 2012 (Jan. 16, 2012), Peachpit Press; i edition, US, XP882719283, pp. 187-188.

\* cited by examiner

| Use Activity Names | Use Activity Values | Weightings |
| --- | --- | --- |
| Last Time Song K was played | A1 | WT1 |
| Ratings of Song K | A2 | WT2 |
| Number of Times Song K was Played | A3 | WT3 |
| Number of Times Song K Appeared in playlists | A4 | WT4 |
| Time of Day | A5 | WT5 |
| Purchase Time of Song K | A6 | WT6 |
| Social Network Interactions of Song K | A7 | WT7 |

| Use Activity Names | Use Activity Values | Weightings |
|---|---|---|
| Last Time Song K was played | 0.9 | 0.5 |
| Ratings of Song K | 0.8 | 0.5 |
| Number of Times Song K was Played | 0.8 | 0.8 |
| Number of Times Song K Appeared in playlists | 0.7 | 1 |
| Time of Day | 0.2 | 0.4 |
| Purchase Time of Song K | 0.4 | 0.6 |
| Social Network Interactions of Song K | 0.6 | 0.2 |

FIG. 5B (Time $T_0$)

| Use Activity Names | Use Activity Values | Weightings |
|---|---|---|
| Last Time Song K was played | 0.9 | 1 |
| Ratings of Song K | 0.8 | 0.5 |
| Number of Times Song K was Played | 0.8 | 0.8 |
| Number of Times Song K Appeared in playlists | 0.7 | 0.5 |
| Time of Day | 0.2 | 0.4 |
| Purchase Time of Song K | 0.4 | 0.6 |
| Social Network Interactions of Song K | 0.6 | 0.8 |

FIG. 5C (Time $T_1$)

METHOD AND SYSTEM FOR PREFETCHING MUSIC FOR DEVICES

BACKGROUND

Internet applications have grown tremendously over the years and so has the functionality provided to devices that access those applications. One area that has seen such growth relates to audio file management. An audio file management application enables a user to search and purchase music selections online and store the purchased music in cloud storage. Audio file management applications also enable users to access and play music stored in the cloud storage using a network connected device. A user may play a song stored in the cloud storage by clicking an icon displayed in the display screen of the user device, and the icon is associated with a song stored in the cloud storage. The song stored in the cloud storage needs to be downloaded to the user device before the song can be played. As a result, there is a delay between the time when the user clicks on the icon associated with the song and the time when the song is played.

It is in this context that embodiments arise.

SUMMARY

Embodiments of the present disclosure provide methods and systems for prefetching music for mobile devices. In one embodiment, at certain points in time, only certain music is selected for prefetching. The music that is prefetched is, in embodiment, likely to be the music that will be selected by a user for play. Thus, reduced delays in download by using background prefetching will enhance user experience. Over time, as a user listens to different music, the background prefetching will also change, mapping to the user's changes in music preferences. It should be appreciated that the present disclosure can be implemented in numerous ways, such as a process, an apparatus, a system, a device, or a method on a computer readable medium. Several inventive embodiments of the present disclosure are described below.

In one embodiment, a method for prefetching music for devices is disclosed. The method includes detecting access to a music library through a device. The music library is managed in cloud music storage and is associated with a user music account. The use activities for the user music account are monitored and the use activities of selected songs in the music library are adjustable for relevance based on assigned weightings. The disclosed method further includes identifying one or more songs from the music library that satisfy a prefetching constraint based on the monitored use activities, and the songs that satisfy the prefetching constraint are tagged for transferring to the device. The tagged songs are transferred to the mobile device without receiving a user initiated request for the tagged songs. The disclosed method may be executed by a processor. In one embodiment, the prefetching constraint of a song in the music library may be measured by calculating a prefetching score for the song.

In another embodiment, a method for prefetching music for mobile devices is disclosed. The disclosed method includes identifying if an access to a music library is through a mobile device and transmitting the use activities for the user music account. The music library is associated with the user music account and is managed in cloud music storage. The transmitted use activities for the user music account are monitored and the use activities of selected songs in the music library are adjustable for relevance based on assigned weightings. The method further includes identifying one or more songs from the music library that satisfy a prefetching constraint based on the monitored use activities. The songs that satisfy the prefetching constraint are tagged for transferring to the mobile device. The tagged songs are received by the mobile device without sending a user initiated request for the tagged songs. The disclosed method is executed by a processor.

In yet another embodiment, a system for prefetching music for mobile devices is disclosed. The system includes a user access module, a device identifier, prefetching logic, and at least one processor configured to execute the user access module, the device identifier, and the prefetching logic. In one embodiment, the user access module, the device identifier, and the prefetching logic reside in a music manager server that manages cloud music storage. The user access module is configured to detect access to a music library that is associated with a user music account and is managed in the cloud music storage. The device identifier is configured to identify if the detected access is through a mobile device. The prefetching logic is configured to monitor the use activities for the user music account, and the user activities of selected songs in the music library are adjustable for relevance based on assigned weightings. The prefetching logic may be further configured to identify one or more songs from the music library that satisfy a prefetching constraint based on the monitored use activities. The songs that satisfy the prefetching constraint are tagged for transferring to the mobile device. In one embodiment, the prefetching logic is configured to transfer the tagged songs to the mobile device without receiving a user request for the tagged songs.

In yet still another embodiment, a system for prefetching music for mobile devices is disclosed. The disclosed system includes a device identifier, music logic, prefetching logic, and at least one processor configured to execute the device identifier, the prefetching logic, and the music logic. In one embodiment, the device identifier, the music logic, and the prefetching logic reside in the mobile device used to access a music library managed in cloud music storage. The device identifier is configured to identify if an access to a music library is through a mobile device, and the music library is associated with a user music account and is managed in cloud music storage. The music logic is configured to transmit the use activities for the user music account. The prefetching logic is configured to monitor the use activities for the user music account and identify one or more songs from the music library that satisfy a prefetching constraint based on the monitored use activities. The songs that satisfy the prefetching constraint are tagged for transferring to the mobile device. The use activities of selected songs in the music library are adjustable for relevance based on assigned weightings. The music logic is further configured to receive the tagged songs by the mobile device without sending a user initiated request for the tagged songs.

Other aspects will become apparent from the following detailed description, taken in conjunction with the accompanying drawings.

BRIEF DESCRIPTION OF THE DRAWINGS

The disclosure may best be understood by reference to the following description taken in conjunction with the accompanying drawings.

FIGS. 5B and 5C illustrate dynamically assigned weighting changes based on monitored use activities from time T0 to time T1, in accordance with one embodiment of the present disclosure.

DETAILED DESCRIPTION

Figure 1:
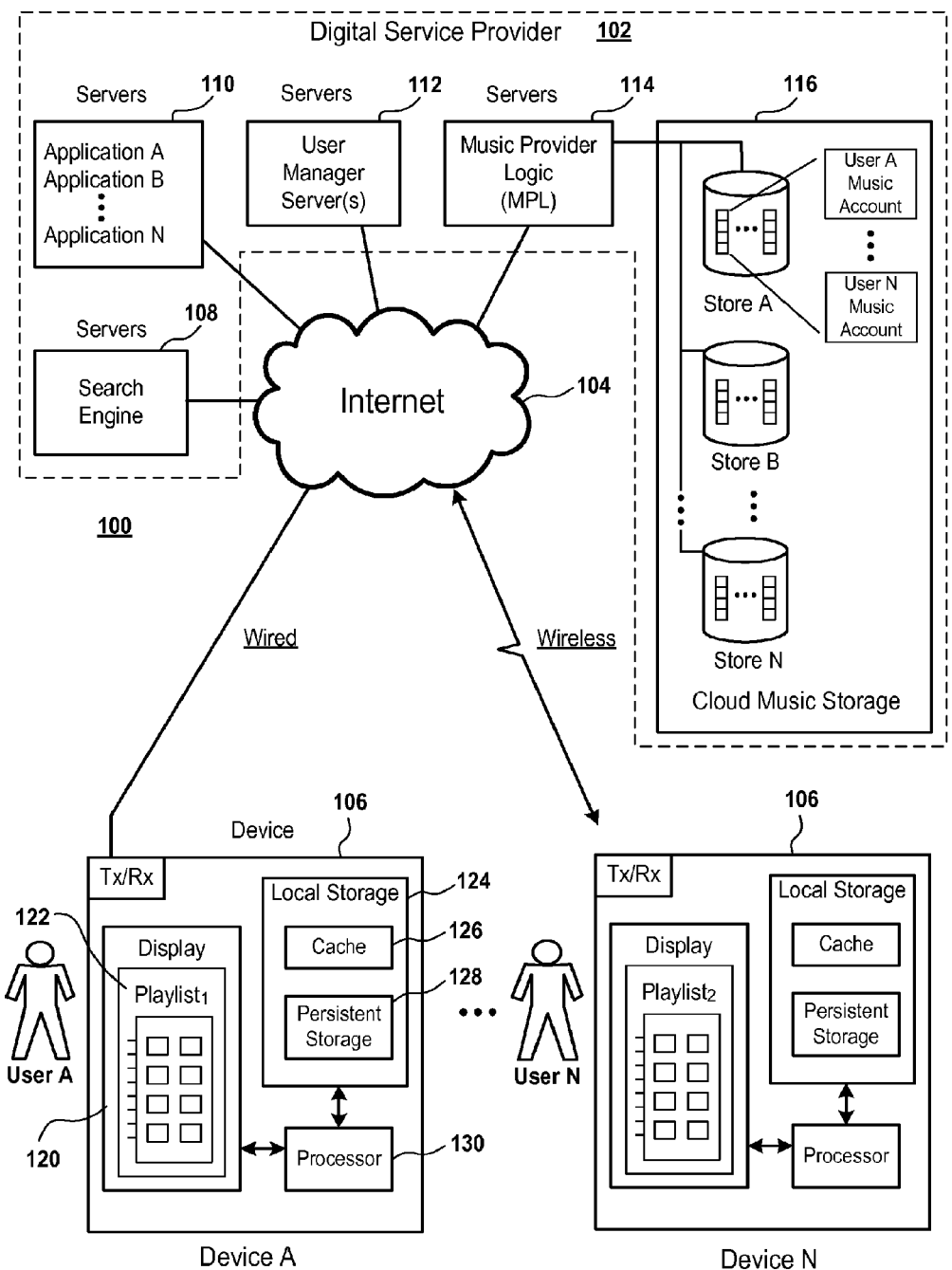
FIG. 1 illustrates a system diagram for enabling access and playing of music files stored in a cloud music storage, in accordance with one embodiment of the present disclosure.

Methods and systems for prefetching music for devices are disclosed. The music to be prefetched is stored in music libraries managed in cloud music storage of a digital service provider. In one embodiment, a method for prefetching music for devices includes detecting the access to a music library associated with a user music account through a device. The method further includes monitoring the use activities for the user music account and the use activities of selected songs in the music library are adjustable for relevance based on assigned weightings. After the songs from the music library that satisfy a prefetching constraint are identified based on the monitored use activities, the identified songs are tagged for transferring to the device without receiving a user initiated request for the tagged songs.

In another embodiment, a method for prefetching music for mobile devices includes identifying if an access to a music library is through a mobile device and transmitting the use activities for a user music account. The music library is associated with the user music account and is managed in cloud music storage. The disclosed method further includes monitoring the use activities for the user music account and the use activities of selected songs in the music library are adjustable for relevance based on assigned weightings. After the songs that satisfy a prefetching constraint based on the monitored use activities are identified in the music library, the identified songs are tagged for transferring to the mobile device. The tagged songs are received by the mobile device without receiving a user initiated request for the tagged songs. The transferring, therefore, functions as an automatic process that updates which songs should be sent to the device (e.g., prefetched), so as to best satisfy the user's likely selection of songs to play. If the correct list of songs are prefetched and stored in the device, there will be not wait time for download streaming. If most of the user's selected songs are prefetched, then still the user's experience will be improved, as the user will not need to wait for downloading of every selected song.

The following description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in a simple block diagram format in order to avoid unnecessarily obscuring the present disclosure. Thus, the specific details set forth are merely exemplary. Particular implementations may vary from these exemplary details and still be contemplated to be within the spirit and scope of the present disclosure.

Reference in the description to "one embodiment" or "an embodiment" means that a particular feature, structure, or characteristic described in connection with the embodiment is included in at least one embodiment of the disclosure. The appearances of the phrase "in one embodiment" in various places in the specification do not necessarily all refer to the same embodiment.

FIG. 1 illustrates a system diagram 100 for enabling access and playing of music files stored in cloud music storage, in accordance with one embodiment of the present disclosure. The system 100 includes a plurality of servers that are connected to the Internet 104. The plurality of servers and storage are, in one embodiment, part of a digital service provider 102. The digital service provider 102, is a system that can include a plurality of servers that can provide applications, services, digital content, and interconnectivity between systems, applications, users, and social networks. For example, the digital service provider 102 can include a search engine 108, a plurality of servers 110 that provide applications for various business, social, and technology related subject matter, servers that provide user management 112, and servers to provide music related services 114.

One example digital service provider 102 can be Google Inc., of Mountain View Calif. Some digital service providers may be more focused on providing only specific services, while others provide a variety of services for access, download, viewing, searching, etc. The content can vary greatly, but is commonly presented in digital format and displayed on monitors or screens of devices, computers, smartphones, tablets, etc.

The servers that provide music related services, in one embodiment, are illustrated by the music provider logic 114, that executes over one or more servers that are connected to the Internet 104. The music provider logic 114 is shown connected to cloud music storage 116. Cloud music storage 116 is shown to include a plurality of storage systems, identified as store A, store B, ... store N. The various storage systems that hold music data and music metadata, are provided with fast access to the Internet, for providing music data on demand to users requiring access to their music accounts stored in cloud music storage 116. In one embodiment, users can access the cloud music storage 116 by way of a plurality of devices 106. The plurality of devices can include any type of device having a processor and memory, wired or wireless, portable or not portable. In the example illustrated in FIG. 1, user A is shown to have device 106 (device A). Device 106 is shown to include communication logic for transmitting and receiving data between device 106 and the Internet 104.

The communication logic (Tx/Rx) can include various types of network interface circuitry, radio-communication (e.g. wireless), cell tower communication, or interconnected wiring connected to Internet service providers. Device 106 is also shown to include a display having a screen 120, local storage 124, and a processor 130. Local storage 124 can include cash memory 126, persistent storage 128, and other logic. In this example, device 106 is shown to include graphical icons (e.g., graphical user interfaces GUIs) that represent a play list. The screen 120 can be a touch-screen, or a display typically provided by a flat-panel display, a cathode ray tube (CRT), or other media capable of rendering a display. Still further, device 106 can have its display separate from the device, similar to a desktop computer or a laptop computer. Still further yet, device 106 can be in the form of a smartphone, a tablet computer, or hybrids that provide touch screen capability in a portable form factor. One example device can include a portable phone device that runs an operating system and is provided with access to various applications (apps) that may be obtained over the Internet, and executed on the local portable device (e.g., smartphone, tablet, laptop, desktop, etc.).

In one embodiment, the user of device 106 can install an application that provides cloud storage of music files, and access to the storage cloud music files from device 106. Once the user's music files are uploaded to the cloud music storage 116, the user's music files are associated to a library of the user. In one embodiment, a plurality of users can access the same application and can upload their own music files to create their own libraries, which will be stored in the cloud music storage 116.

Each of such users can then access the cloud music storage 116 through an application on their device 106 to render and play selected music files on their device, when device 106 has access to the Internet and associated servers of the music provider logic 114 and cloud music storage 116. Accordingly, users can access the music application on their device 106, access all music files stored in cloud music storage 116, arrange music titles in their music library into playlists, add music to cloud music storage 116, delete music from cloud music storage 116, and purchase music that is added to cloud music storage 116. These changes are maintained and managed by the music provider logic 114 and the music provider logic 114 will provide access to the various users to their music files stored in cloud music storage 116, based on their selections during use of the application.

Figure 2:
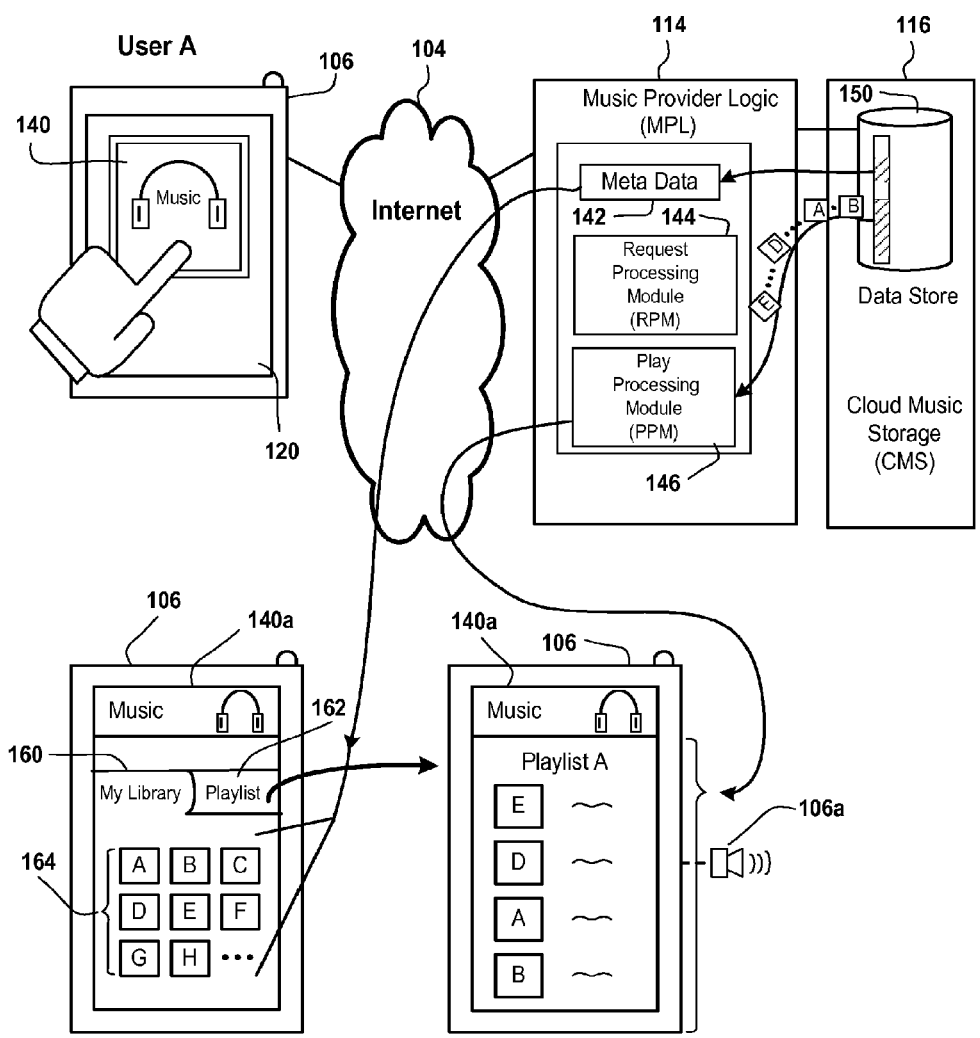
FIG. 2 illustrates how user A utilizes a device (e.g. smartphone) to access his or her music account stored in the cloud music storage (CMS), in accordance with one embodiment of the present disclosure.

FIG. 2 illustrates how user A utilizes a device 106 (e.g. smartphone) to access his music library stored in cloud music storage 116, in accordance with one embodiment of the present disclosure. As shown, device 106 will include a screen 120, and associated graphical icons that present a thumbnail of an application 140, associated with a music application. Application 140, as described herein, relates to an application that provides a user with access to his or her music library which has been previously added to the cloud music storage 116. If the user is a new user to the application 140, the new user can download application 140 to device 106 from at least one server 110 of the digital service provider 102.

Once application 140 has been downloaded and installed on device 106, the icon representing application 140 will be rendered on the display screen of device 106. Initially, the user will be prompted to select music to add to cloud music storage 116. The music may be added from files currently maintained by the user on his or her device 106, on other devices of the user such as computers, other smartphone and or tablets, or other storage media. Additionally, the user can add music files that may be part of a music library maintained by another application. The other application may maintain a specific format for the music, and the music can be obtained and translated to standardize music files for addition to cloud music storage 116.

Once the user has managed his library to add, modify, or adjust the music files present in cloud music storage 116, the user can access application 140 and various options from graphical user interfaces provided on the screen 120 of device 106. In the illustrated example, device 106 will open application 140 through various graphical user interface ("UI") screens, such as interface 140a. Interface 140a can include various menus, selection icons, configuration icons, displays, advertisements, buttons, listings, etc. In this example, interface 140a may include an image that lists the user's library 160, the user's playlists 162, and music title icons 164. Music title icons can be represented by graphical artwork that represents artwork associated with the various music files present in the user's library. The user's library is illustrated by music title icons 164, shown as A-H.

The music title icons 164 are rendered on the screen 120 upon obtaining metadata from cloud music storage 116 (or accessing the metadata from previous download(s) stored locally on the user device), which may be present in data store 150. Music provider logic 114 will include request processing module 144 that manages the requests and communication between various users applications 140 and the cloud music storage 116. The request processing module (RPM) 144 is also in communication with a play processing module (PPM) 146. In order to render the title icons 164 on the screen of device 106, music provider logic 114 will utilize the request processing module 144 to obtain metadata 142 from the data store 150.

The metadata 142 will be the metadata associated with the various music files stored in data store 150. The metadata 142 provides information regarding each of the titles stored in cloud music storage 116, and sufficient information to render the title icons 164 on the screen of device 106, and provides text information, duration information, genre information, and other data that describes aspects or characteristics of the music files. As shown, when the user selects playlist 162 on device 106, a playlist graphical user interface is shown identifying particular songs that have been arranged by the user.

Playlist A, part of the playlist 162, represents various songs that were selected by the user. The user can have various playlists, and the selection of playlist A is only provided as one example of a playlist that includes music files that are played in the order E→D→A→B. Once the user selects a corresponding play button or clicks on one of the audio files in the playlist, the music files will begin to play, via the speaker 106a, in the order arranged and defined by the user in his or her playlist A.

Figure 3A:
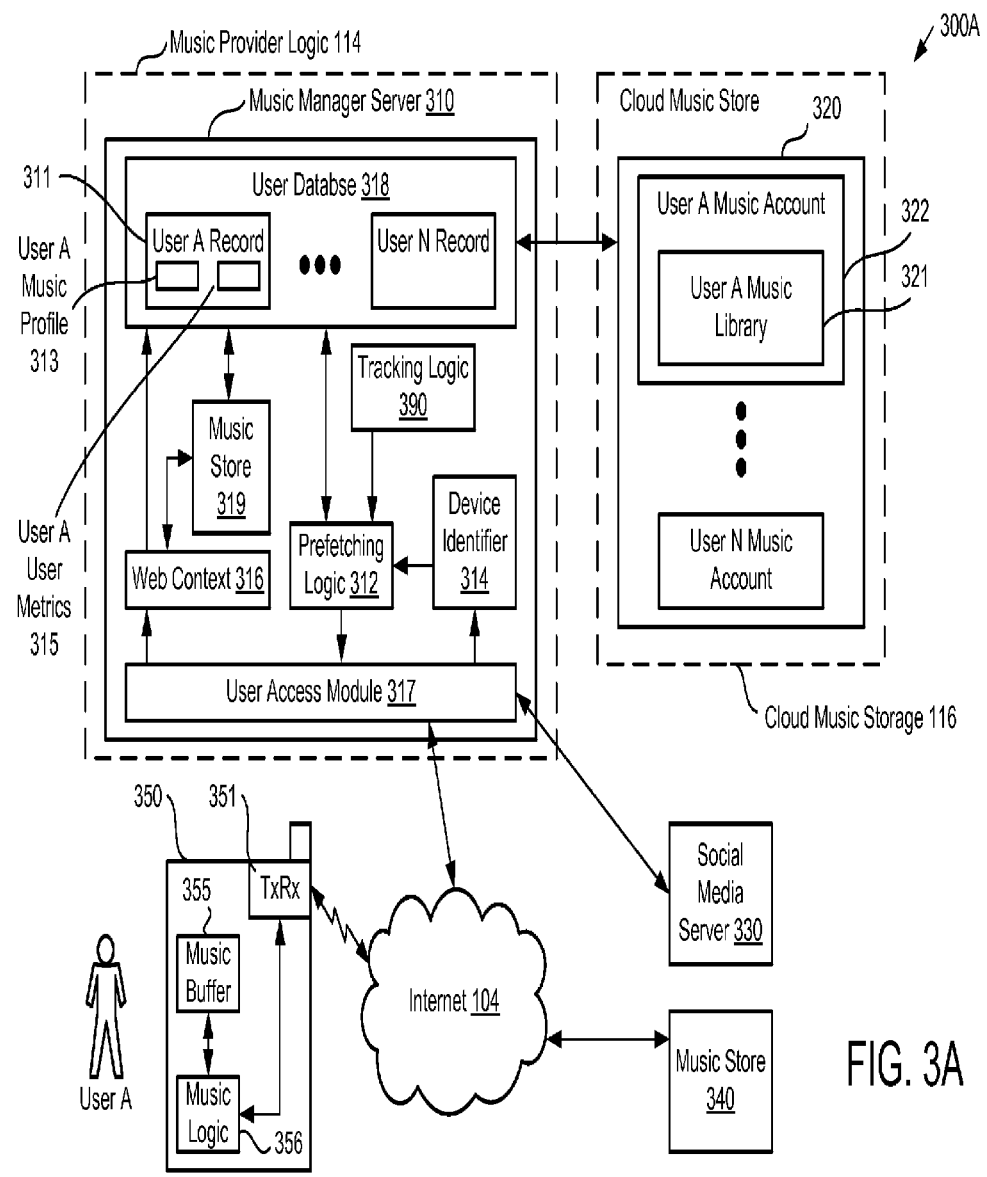
FIG. 3A illustrates a system diagram for prefetching music for a mobile device, in accordance with one embodiment of the present disclosure.

FIG. 3A illustrates a system diagram 300A for prefetching music for a mobile device, in accordance with one embodiment of the present disclosure. The system 300A includes a music manager server 310, a cloud music store 320, a social media server 330, and a music store 340.

In one embodiment, music manager server 310 is part of music provider logic 114, and cloud music store 320 is part of cloud music storage 116, as shown in FIG. 1. In other embodiments, music manager server 310 may be defined from a separate processing system. For example, music manager server 310 may be stored in a separate processing system to be accessed by users over Internet 104, and the separate server may work in conjunction with or in coordination with music provider logic 114.

As shown in FIG. 3A, music manager server 310 includes prefetching logic 312, a device identifier 314, use context 316, a user access module 317, a user database 318, a music store 319, and tracking logic 390. In one embodiment, user access module 317 may be used to detect a user's access to the music library after the user logs into his or her music account. For example, user A may access user A music library 321 after user A logs into his or her music account 322 that is managed by cloud music store 320. Once a user has logged into his or her music account, user access module 317 may communicate the user login information to use context 316 and device identifier 314. Use context 316, in turn, may send the user login information to user database 318 to be saved in a record associated with the user.

In the example illustrated in FIG. 3A, although a user (e.g., user A) is shown to access the services provided by music manager server 310 via Internet 104, it is to be understood that in practice, many more users may access the services provided by music manager server 310, and the services may be widely distributed across a network. In this example, user A has a user device 350 that has access to an application or code for accessing user A music account 322 and the online music stored in user A music library 321. As shown, user device 350 includes communication logic (Tx/Rx) 351, a music buffer 355, and music logic 356. Once user A has established the access to user A music account 322, user device 350 may transmit various use activities related to respective songs stored in user A music library 321. In one embodiment, the use activities for a song in user A music account 322 may be transmitted by music logic 356 via communication logic 351 of user device 350. Use context 316 of music manager server 310 may receive the transmitted use activities for various songs from user device 350 via user access module 317. For example, after user A has logged into his or her music account 322, use context 316 may start to record user A online use activities related to various songs. The recorded use activities for a song in user A music account may be sent by use context 316 to user database 318 to be stored in user A use metrics 315 of user A record 311. User approval of such recording or tracking, is a user option provided by an interface.

In one embodiment, user A may access user A music library 321, which is associated with user A music account 322, through other mobile or non-mobile devices. User access module 317 may be used to detect all accesses made by user A (with user permission), either through user device 350 or other suitable devices, and to send the received use activities to use context 316.

In the example shown in FIG. 3A, user A may access social media server 330, which maintains a plurality of social network user profiles, via user access module 317 of music manager server 310. Use context 316 may record the social network interactions obtained from social medial server 330 via user access module 317. The social network interactions may include, without limitation, whether user A has shared a song stored in user A music library 321 with his or her social network friends, whether user A and his or her social network friends like, dislike, or comment the song, etc. The social network activities of user A may be shared in user A's social network streams or circles, during live chats, or video chats.

In one embodiment, user database 318 includes a plurality of user records, each user record having a music profile portion and a use metrics portion. For example, user A record 311 includes user A music profile 313 and user A use metrics 315. User A music profile 313 may list user A's music collections, created playlists, favorite songs, etc. The songs in user A's music collection may be stored in user A music library 321 associated with user A music account 322 in cloud music store 320. In one embodiment, user database 318 communicates with cloud music store 320 so that the music libraries associated with various user music accounts stored in cloud music store 320 may be updated.

Examples of use activities for a song stored in a user music account includes, without limitation, number of times the song has been played, number of times the song appears in the playlists created by the user, last time the song was played, ratings of the song, current time of day, social network interactions for the song, purchase time for the song, similarity between the song and other songs in the music library, etc.

In one embodiment, a user may search and purchase online music from music store 319, which can be associated or connected to music manager server 310. Alternatively, the online music may be purchased from the music store 340 provided by another digital service provider, or online retailer. The purchased music may be stored in an associated user music library managed by cloud music store 320.

In one embodiment, prefetching logic 312 may assign each recorded use activity with an associated use activity value. The assigned use activity values may be stored along with the use activities in a use metrics portion of a user record in user database 318. The assigned use activity values may vary depending upon the type of use activities recorded. Each assigned use activity may be pre-defined, for example, based on the pre-determined rules of an online music service provider (or defined by the user in advanced settings). In one embodiment, the assigned use activity values ranges from 0 to 1.

In one embodiment, prefetching logic 312 may pull the use metrics portion of each user record in user database 318 at pre-determined intervals to monitor the documented use activities for the songs stored in a user music library. In one embodiment, prefetching logic 312 may dynamically assign various weightings for each or certain use activities of a selected song in the user's music library based on monitored use activities for the selected song. The assigned weightings may be dynamically adjusted by prefetching logic 312 if the changes to use activities for the user music account have reached a pre-determined threshold. The changes to use activities for a user music account may be determined based on time changes, user device location changes, recent use activity changes, etc. For example, after a song has been played three times in a week, the use activity "Number of Times the Song was Played" may be assigned more weighing. In another example, the use activity "Purchase Time of a Song" for a song may be assigned more weighting, if the song was purchased recently. The dynamically assigned weightings for the use activities may be used to emphasize or deemphasize certain use activities when calculating the prefetching constraint for the song. In one embodiment, the assigned weighting for a use activity may range from 0 to 1.

In one embodiment, prefetching logic 312 may identify one or more songs from the music library that satisfy a pre-defined prefetching constraint such that the songs that satisfy the prefetching constraint are tagged for transferring to the user's device if the use device is a mobile device. The prefetching constraint of a song, e.g., may be measured by calculating a prefetching score for the song based on the assigned use activity values and weightings for various use activities of the song. If the prefetching score of a song in a user's music library has reached a pre-determined target score, the song will be tagged to be transferred to the user device if the user device is a mobile device.

In one embodiment, the location of a user device may be tracked by tracking logic 390 (with user permission), that passes the user device location information to prefetching logic 312. In one embodiment, tracking logic 390 may obtain location data from other tracking services, or location identifying services. For example, location identifying services may include, without limitation, signal processing from a cellular towers, GPS processors, Wi-Fi signals, IP address resolution processors, Google Latitude, etc.

In one embodiment, once a user's access to his or her music account has been established, device identifier 314 identifies the user device used to log into a user's music account to determine whether the user device is a mobile device. The identification of a mobile device may be depended on the connection speed between the mobile device and the music manager server that manages the user music library. If the identified user device is a mobile device, device identifier 314 informs prefetching logic 312 such that prefetching logic 312 may initiate a transfer of the songs that have been identified to satisfy the pre-defined prefetching constraint to the mobile device without receiving a user request for the identified songs. For example, the identified songs may be transmitted to user A's user device 350 via user access module 317. The transferred songs may be received by music logic 356 via communication logic 351 to be stored in music buffer 355 of user device 350.

In one embodiment, music buffer 355 in user device 350 may be set up by user A via a music buffer setup application. For example, user A may setup the size of music buffer 355 and the size of prefetch. The size of prefetch may be used as a threshold such that when the number of songs that have been tagged for transfer to the user device has reached the size of prefetch, the transmitting of the tagged songs to the mobile device starts to take place. In one embodiment, music logic 356 may monitor the available size of music buffer 355. If the available size of music buffer 355 is less than the size of the songs to be transmitted from music manager server 310, music logic 356 may delete the songs in music buffer 355 based on pre-defined deleting constraint so that music buffer 355 has enough space to store the songs transmitted by prefetching logic 312 of music manager server 310. Examples of pre-defined deleting constraint for a song stored in a music buffer include, without limitation, the song has not been played for a certain period of time, the song was downloaded one month ago, etc.

Figure 3B:
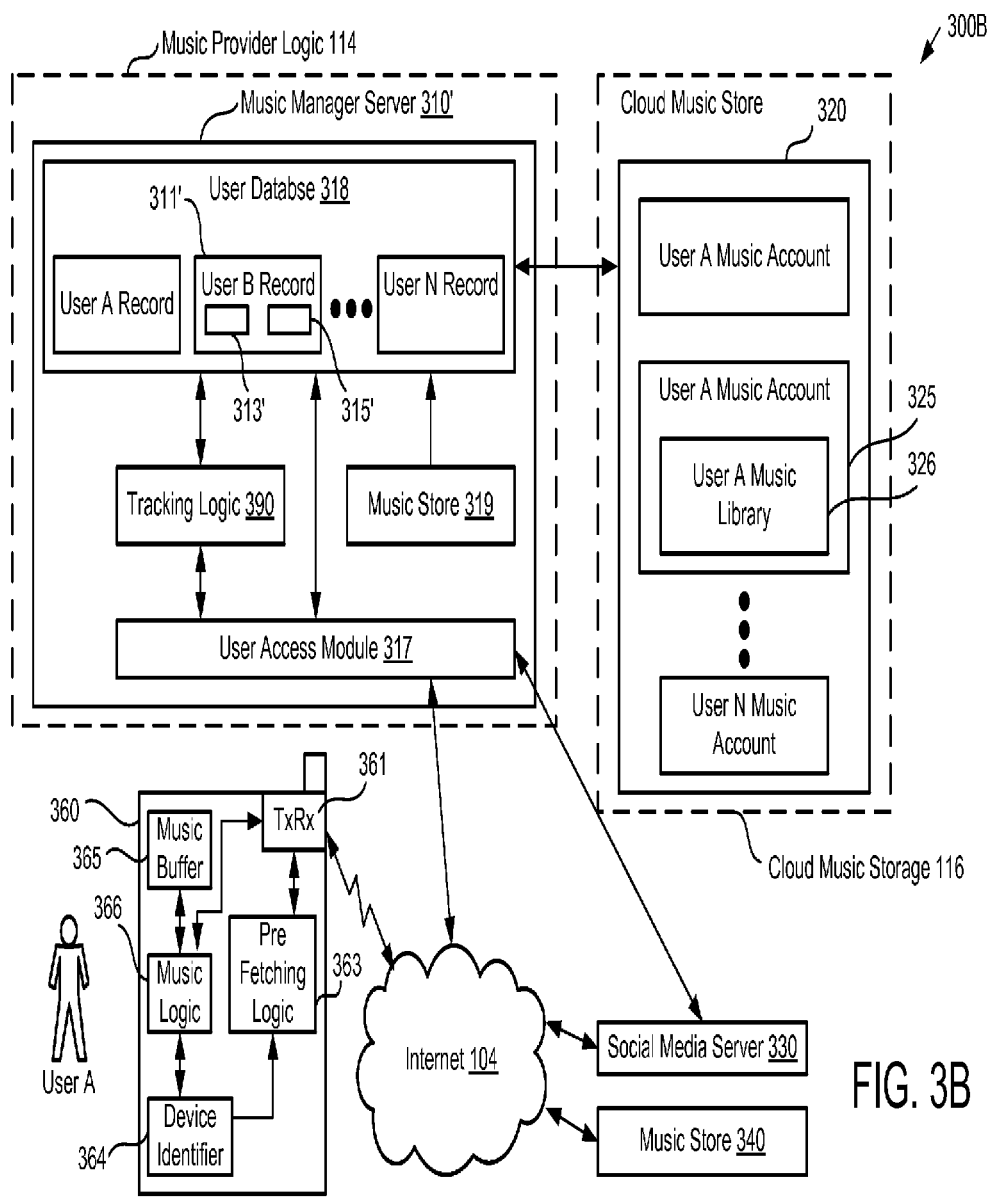
FIG. 3B illustrates a system diagram for prefetching music for a mobile device, in accordance with one embodiment of the present disclosure.

FIG. 3B illustrates a system diagram 300B for prefetching music for a mobile device, in accordance with one embodiment of the present disclosure. The system 300B includes a music manager server 310', cloud music store 320, a social media server 330, and a music store 340. In the example illustrated in FIG. 3B, a user (e.g., user B) may access the services provided by music manager server 310'. It is to be understood that in practice, many more users may access the services provided by music manager server 310', and the services may be widely distributed across a network. In this example, user B has a user device 360 with an application or code for accessing user B music account 325 and the online music stored in user B music library 326.

In one embodiment, music manager server 310' is part of music provider logic 114, and cloud music store 320 is part of cloud music storage 116, as shown in FIG. 1. In other embodiments, music manager server 310' may be defined from a separate processing system. For example, music manager server 310' may be stored in a separate processing system to be accessed by users over Internet 104, and the separate server may work in conjunction with or in coordination with music provider logic 114.

As shown in FIG. 3B, music manager server 310' includes a user access module 317, a user database 318, a music store 319, and tracking logic 390. In one embodiment, user access module 317 may be used to detect a user's access to his or her music account. In one embodiment, a user may establish access to his or her music account by logging into his or her music account. User access module 317 may communicate the user login information to user database 318. The user login information may be saved in a record associated with the user in user database 318. For example, after user B has logged into his or her music account 325 online, user access module 317 will send user B's login information to user database 318 to be stored in user B record 311'. User database 318 may include a plurality of user records with each user record being associated with a user and documenting the use activities for the user's music account. In one embodiment, user B may purchase music online from music store 319, which can be associated or connected to the music manager server 310'. Alternatively, the online music may be purchased from music store 340 provided by another digital service provider, or online retailer.

In the example illustrated in FIG. 3B, user B's user device 360 includes communication logic (Tx/Rx) 361, prefetching logic 363, a device identifier 364, a music buffer 365, and music logic 366. The communication logic 361 includes various types of network interface circuitry, radio-communication (e.g. wireless), cell tower communication, or interconnected wiring connected to Internet service providers, and may be used for transmitting and receiving data between user device 360 and music manager server 310' through Internet 104. In one embodiment, music logic 366 may be used to transmit various use activities conducted by user B to music manager server 310' and receive the prefetched songs from music manager server 310' via communication logic 361.

In one embodiment, similar to the embodiment shown in FIG. 3A, each user record in user database 318 of music manager server 310' includes a user music profile portion and a user use metrics portion. For example, user B record 311' includes user B music profile 313' and user B use metrics 315'. User B music profile 313' may list user B's music collections, created playlists, favorite songs, etc. The songs in user B's music collection may be stored in user B music library 326, which is associated with user B music account 325 in cloud music store 320. In one embodiment, user database 318 communicates with cloud music store 320 so that the music libraries of the various user music accounts stored in cloud music store 320 may be updated.

In the example illustrated in FIG. 3B, user B may access social media server 330 that maintains a plurality of social network user profiles via communication logic 361. User B may share or comment on a song and chat with his or her social network friends while listening to music or performing other online activities. Those social network interactions may be sent by music logic 366 to music manager server 310' to be saved in user B use metrics 315' of user B record 311'.

Examples of use activities for a song stored in a user music account includes, without limitation, number of times the song has been played, number of times the song appears in the playlists created by the user, last time the song was played, ratings of the song, current time of day, social network interactions for the song, purchase time for the song, similarity between the song and other songs in the music library, etc.

In one embodiment, device identified 364 in user device 360 may identify if user device 360 is a mobile device. The identification of user device 360 may depend on the connection speed between user device 360 and music manager server 310'. If user device 360 is a mobile device, device identifier 364 informs prefetching logic 363 so that prefetching logic 363 may start to monitor the use activities stored in user B use metrics 315' by pulling the music manager server 310' at pre-determined time intervals.

In one embodiment, prefetching logic 363 may assign each recorded use activity with an associated use activity value. The assigned use activity values may be stored along with the use activities in a use metrics portion of a user record in user database 318. The assigned use activity values may vary depending upon the type of use activities recorded. Each assigned use activity may be pre-defined based on the pre-determined rules of an online music service provider. In one embodiment, the assigned use activity values ranges from 0 to 1.

In one embodiment, prefetching logic 363 may dynamically assign a weighting to each or selected use activities for a song stored in user B music library 326 based on monitored use activities. The assigned weightings may range from 0 to 1. The assigned weightings may be recorded in user B use metrics 315' as well. The assigned weightings to various use activities may be dynamically adjusted by prefetching logic 363 if the changes to use activities for user B music account 325 have reached a pre-determined threshold. Examples of changes to use activities for a user music account include, without limitation, time changes, user device location changes, recent use activity changes, etc. For example, the use activity "Purchase Time of a Song" may be assigned a higher weighting if the song was purchased within a week. In another example, the use activity "Number of Times a Song was Played" may be assigned a higher weighting after the song has been played three times in a week, which reaches the pre-determined threshold.

The location of a user device may be tracked by tracking logic 390 that passes the user device location information to prefetching logic 363 via user access module 317 and communication logic 361. In one embodiment, tracking logic 390 may obtain location data from other tracking services, or location identifying services. For example, location identifying services may include, without limitation, signal processing from a cellular towers, GPS processors, Wi-Fi signals, IP address resolution processors, Google Latitude, etc.

In one embodiment, prefetching logic 363 may identify one or more songs, stored in user B music library 326, that satisfy a prefetching constraint, such that the songs that satisfy the prefetching constraint are tagged for transferring to user device 360. For example, the prefetching constraint for a song may be measured by calculating the prefetching scores for the song based on the assigned use activity values and weightings for various use activities.

In one embodiment, prefetching logic 363 may initiate a transfer of tagged songs that satisfy the prefetching constraint from user B music library 326 stored in cloud music store 320 to user device 360. In one embodiment, the receiving of the tagged songs by user device 360 is automatically initiated without receiving user B's request for the tagged songs. In one embodiment, music logic 366 of user device 360 may receive the tagged songs via user access module 317 of the music manager server 310' and communication logic 361 of user device 360. The received songs may be stored in music buffer 365.

In one embodiment, music buffer 365 may be set up by user B via a music buffer setup application (e.g., options menus) previously installed or accessible via user device 360. For example, user B may setup the size of music buffer 365 and the size of prefetch. The size of prefetch may be used as a threshold such that user device 360 does not receive any tagged songs from music manager server 310' until the number of songs that have been tagged for transfer has reached the number of songs defined by the size of prefetch. In one embodiment, music logic 366 may monitor the available size of music buffer 365. If the available size of music buffer 365 is less than the size of the songs to be received from music manager server 310', music logic 366 may delete the songs in music buffer 365 based on pre-defined deleting constraint so that music buffer 365 has enough space to store the received songs. Examples of pre-defined deleting constraint for a song stored in a music buffer include, without limitation, the song has not been played for a month, the song has only been played once after download, etc.

Figures 4, 5A:
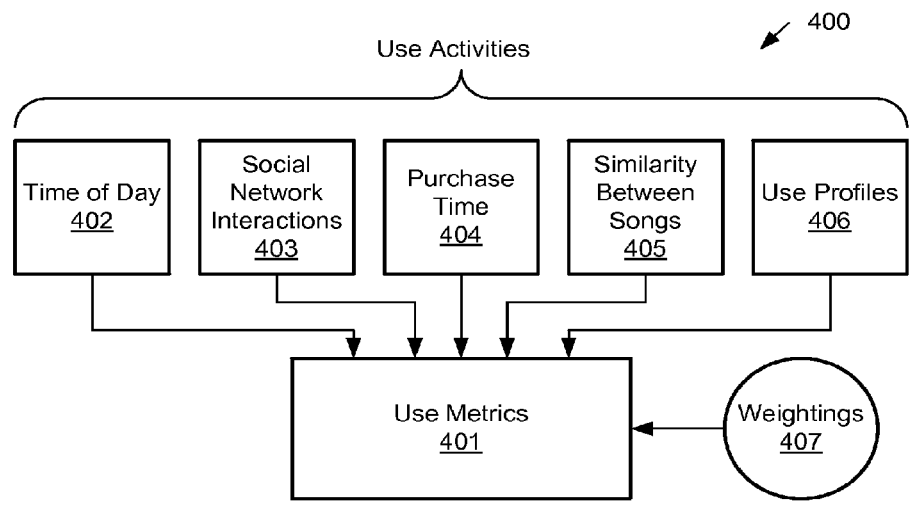
FIG. 4 illustrates a diagram showing various use activities and associated weightings recorded in a use metrics for a user music account, in accordance with one embodiment of the present disclosure.
FIG. 5A illustrates a table 500 of exemplary recorded use activities along with assigned use activity values and weightings for song K, in accordance with one embodiment of the present disclosure.

FIG. 4 illustrates a diagram 400 showing various use activities and associated weightings recorded in a use metrics for a user music account, in accordance with one embodiment of the present disclosure. In one embodiment, the use metrics may be stored in a use metrics portion of a user record in user database 318, as shown in FIG. 3A and FIG. 3B.

In the example shown in FIG. 4, use metrics 401 may record the following use activities for the songs stored in the music library of a user's music account: time of day 402, social network interactions 403, purchase time 404, similarity between songs 405, and use profiles 406. Examples of use profiles 406 of a song may include, without limitation, number of times the song has appeared in the playlists created in the user music account, play counts of the song, the time when the song was last played, the rating of the song, etc.

In one embodiment, each recorded use activity in use metrics is assigned an associated use activity value based on pre-defined rules of an online music service provider. The use activity value for each use activity may vary based on the type of use activities. For example, the use activity "Last Time a Song was Played" may be assigned a higher use activity value, while the use activity "Time of Day" may be assigned a lower use activity value.

In one embodiment, weightings 407 may be dynamically assigned, e.g., by prefetching logic 312 shown in FIG. 3A or prefetching logic 363 shown in FIG. 3B, to each or certain recorded use activities for particular songs based on pre-determined rules. The assigned weightings 407 are also recorded in use metrics 401. Weightings 407 may be used to emphasize or deemphasize certain use activities compared to others for the measurement of prefetching constraint.

In one embodiment, the assigned weightings 407 may be dynamically adjusted by prefetching logic 312 or prefetching logic 363 if changes to use activities have reached a pre-determined threshold. For example, if the current time is at or close to the time when the song was last played, the weighting assigned to the use activity "time of day 402" may be increased, thus increasing the prefetching constraint of the song. In another example, if a song was purchased within a pre-defined time period, use activity "purchase time 404" of the song may be emphasized by increasing its assigned weighting. In yet another example, if the user has recently purchased more songs that are similar to the song the use activities of which are monitored, the weighting assigned to use activity "similarity between songs 405" for the song may be increased.

FIG. 5A illustrates a table 500 of exemplary recorded use activities along with assigned use activity values and weightings for song K, in accordance with one embodiment of the present disclosure. In one embodiment, the use metrics may be saved in an associated user record in a user database, e.g., user database 318, as shown in FIG. 3A and FIG. 3B.

As shown, example recorded use activities for song K in are: last time song K was played, ratings of song K, number of times song K was played, number of times song K appeared in playlists, time of day, purchase time of song K, and social network interactions of song K. As shown, each recorded use activity for song K is assigned an associated use activity value, e.g., A1, A2, . . . A7, and each recorded use activity for song K is assigned a weighting, e.g., Wt1, Wt2, Wt3, Wt7. In one embodiment, the assigned use activity values are pre-defined based on pre-determined rules of an online music service provider, while the assigned weightings are dynamically adjustable based on the monitored use activity changes. In one example, the use activity values and the weightings may be assigned by prefetching logic 312 or prefetching logic 363, as shown in FIG. 3A and FIG. 3B.

In this embodiment, an assigned weighting is a value between 0 and 1, where 0 is low importance and 1 is high importance. In still other embodiments, weighting values can be larger than 1 and less than 0. In the main example, if a particular use activity is, at some point in time important, the weighing assigned to the use activity can be closed to 1, such as 0.85. If a use activity is determined to be of low importance, the weighting assigned can be close to 0, such as 0.1 or 0. In a more specific example, if the use activity "Number of Times Song K was Played" is initially assigned a weighting having a value of 0.5, the assigned weighting can be dynamically changed to 1 if song K has been played three times a day recently. Similarly, each of the assigned use activity values is a value between 0 and 1, where 0 is low importance and 1 is high importance. The importance of each use activity has been pre-determined.

In one embodiment, the prefetching constraint of song K may be measured by calculating a prefetching score based on the recorded use activities of song K. A prefetching score of a song may be calculated by Σ (Use Activity Value (i)×assigned Weighting (i)/Total Number of Use Activities, where i=1 . . . Total Number of Use Activities.

For example, the total number of recorded use activities in FIG. 5A is 7, and the prefetching score of song K based on the recorded use activities may be calculated as:

Prefetching Score of Song $K=\Sigma(A1 \times Wt1 + A2 \times Wt2 \ldots + A7 \times Wt7)/7$ where A1 to A7 are the use activity values for the recorded use activities and Wt1 to Wt7 are respectively assigned weightings. In one embodiment, the use activity values and the associated weightings may be assigned by prefetching logic 312 (FIG. 3A) or prefetching logic 363 (FIG. 3B).

FIGS. 5B and 5C illustrate dynamically assigned weighting changes based on monitored use activities from time T0 to time T1, in accordance with one embodiment of the present invention. As shown in FIG. 5B and FIG. 5C, the use activity values, ranging from 0 to 1, for the recorded use activities are pre-defined based on the importance of each use activity by an online music service provider. In one embodiment, the assigned use activity values may not be adjustable based on the monitored use activity changes. For example, the use activity "Last Time Song K was Played" has been determined to be the most important use activity, thereby being given a use activity value of 0.9. While the use activity "Time of Day" has been determined to be the least important use activity, thereby being given a use activity value of 0.2.

FIG. 5B shows the assigned use activity values and weightings at T0. At time T0, the use activity "Number of Times Song K Appeared in Playlists" has been given the most emphasis with a weighing value of 1, while the use activity "Social Network Interactions of Song K" has been given the least emphasis with a weighting value of 0.2. As shown in FIG. 5C, at time T1, the use activity "Last Time Song K was Played" has been given the most emphasis, because song K was playing at or just played prior to Time T1. As a result, the assigned weighting of for this use activity has been dynamically adjusted from 0.5 (at time T0) to 1 (at time T1). Also, the use activity "Number of Times Song K Appeared in Playlists" has been deemphasized because the number of playlists that include song K has reduced, Thus, the weighting assigned for this use activity has been adjusted from 1 (at time T0) to 0.5 (at time T1). In addition, at time T1, the use activity "Social Network Interactions of Song K" has been emphasized, with the weighting changes from 0.2 (at time T0) to 0.8 (at time T1), based on the increased social network interactions for song K.

Accordingly, the prefetching score of song K at time T0=(0.9×0.5+0.8×0.5+0.8×0.8+0.7×1+0.2×0.4+0.4×0.6+0.6×0.2)/7=0.3757

The prefetching score of song K at time T1=(0.9×1+0.8×0.5+0.8×0.8+0.7×0.5+0.2×0.4+0.4×0.6+0.6×0.8)/7=0.4414

If the target score for the prefetching constraint of song K is 0.4, then song K at time T1 satisfies the prefetching constraint. This means, that song K should be automatically prefetched and added to the user's device storage. This process happens automatically, as either a cloud process, a device process, or a combination of cloud and device shared process. Furthermore, although the example was provided for one song K, the process is repeated or processed for all songs in the user's library, which will identify each of the songs that will be automatically prefetched.

Figure 6:
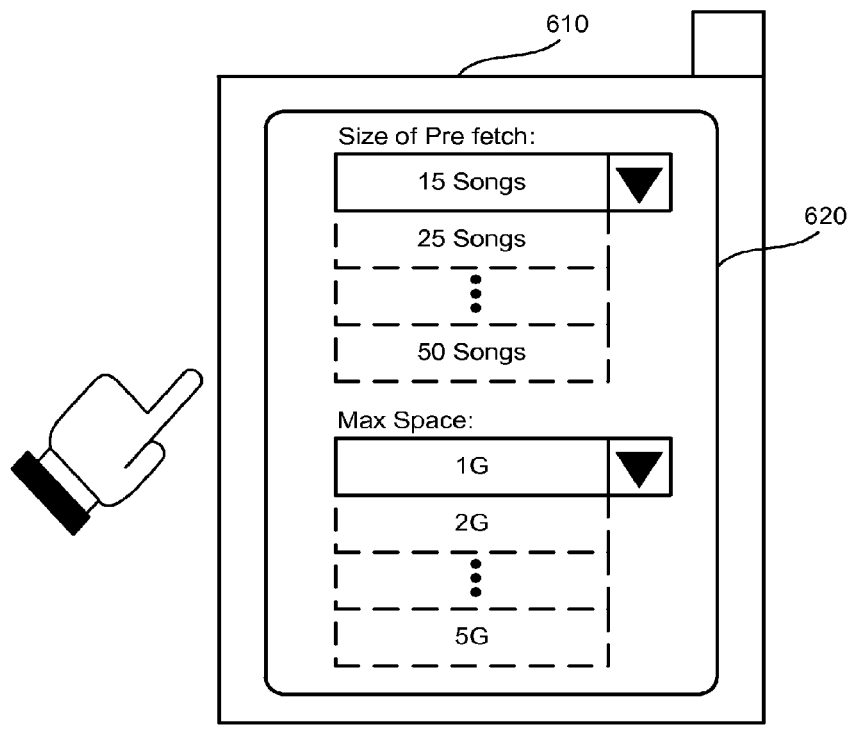
FIG. 6 illustrates an exemplary user interface for setting up a music buffer in a user device, in accordance with one embodiment of the present disclosure.

FIG. 6 illustrates an exemplary user interface for setting up a music buffer in a user device, in accordance with one embodiment of the present disclosure. As shown in FIG. 6, user device 610 includes a display screen 620. An application for setting up a music buffer in user device 610 has been installed in user device 610 and the user interface of the installed set up application is rendered on display screen 620. A user may choose to set up the maximum space of the music buffer (e.g., 1G, 2G, . . . 5G) and the size of prefetch for tagged songs (e.g., 15 songs, 25 songs, . . . 50 songs). The size of prefetch may define a song transferring threshold such that the use device 610 does not receive any tagged songs until the number of tagged songs has reached the number of songs defined by the size of prefetch.

Although FIG. 6 shows a music buffer in a user device may be set up by two pull down menus, it is to be understood that a music buffer in a user device may be set up by other suitable means rendered in the user interface of the user device, e.g., radio buttons, check boxes, voice, gestures, etc.

Figure 7:
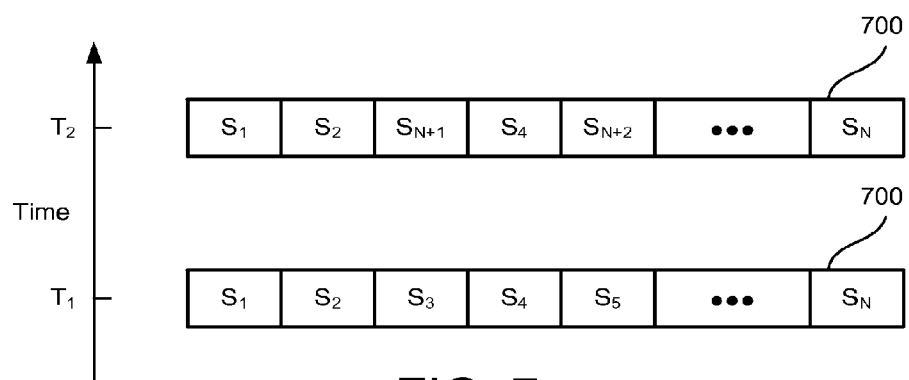
FIG. 7 shows an exemplary update in a music buffer from time t1 to time t2, in accordance with one embodiment of the present disclosure.

FIG. 7 shows an exemplary update in a music buffer 700 from time t1 to time t2, in accordance with one embodiment of the present disclosure. In one embodiment, music buffer 700 is located in a user device, e.g., user device 360 and is managed by music logic, e.g., music logic 366, as shown in FIG. 3B.

In the embodiment shown in FIG. 7, at time t1, music buffer 700 is full with N number of songs, e.g., S1, S2, S3, S4, S5, . . . Sn. At time t2, two other songs Sn+1 and Sn+2, which are tagged by prefetching logic, e.g., prefetching logic 363 of music manager server 310' in FIG. 3B, need to be transmitted and saved in music buffer 700. Since music buffer 700 was full, songs, stored in music buffer 700, that satisfy a deleting constraint need to be deleted. In this example, songs S3 and S5 are deleted based on the deleting constraints of songs S3 and S5 measured at time t2. For example, songs S3 and S5 may be deleted because songs S3 and S5 have not been played for a certain period of time or because songs S3 and S5 have been played with limited number of times after the downloads. In another example, songs S3 and S5 may be deleted because the user has recently purchased and uploaded new songs to his or her music account that are different in type than songs S3 and S5.

It is to be understood that whether any songs need to deleted from a music buffer may depend on the size of the user music library. For example, if a user has a small music collection and the number of songs in the user's music library is less than the maximum available size of the music buffer, in this case, no deletion of songs is needed from the music buffer.

Figure 8A:
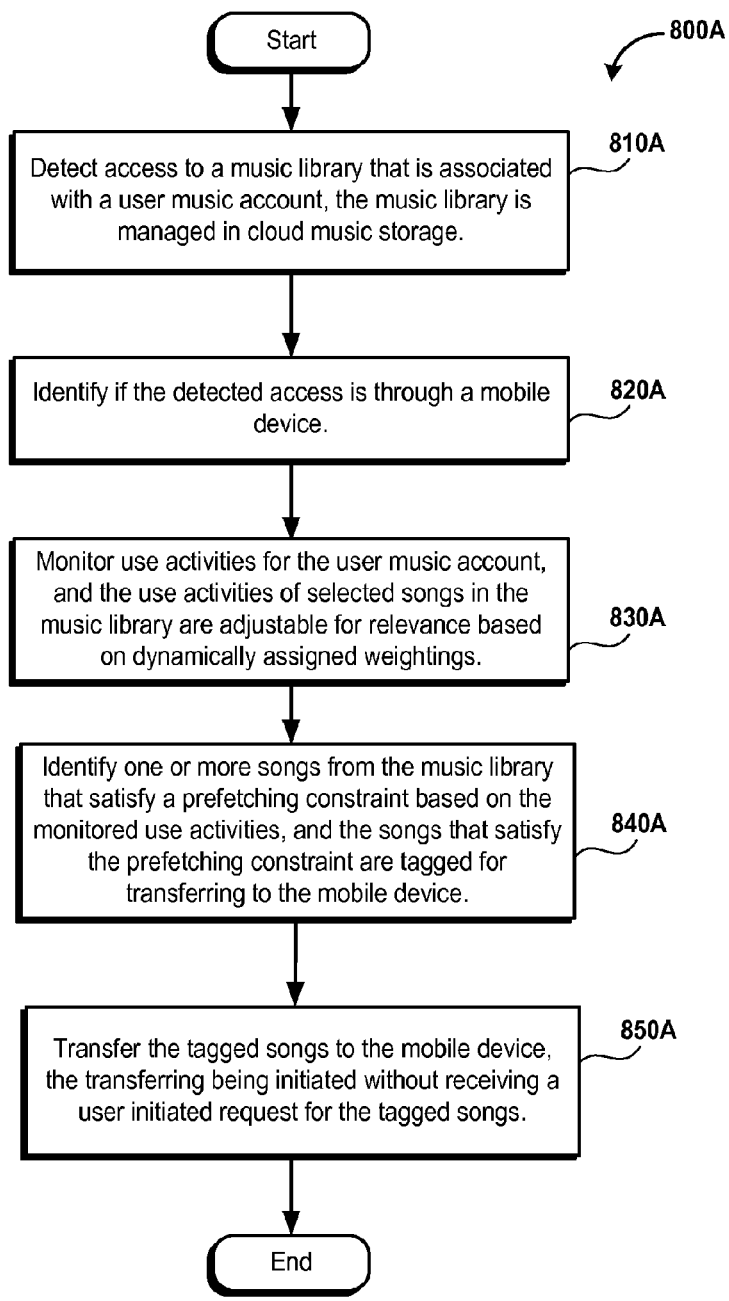
FIG. 8A illustrates a flow diagram of an exemplary method for prefetching music for mobile devices, in accordance with one embodiment of the present disclosure.

FIG. 8A illustrates a flow diagram of an exemplary method 800A for prefetching music for mobile devices, in accordance with one embodiment of the present disclosure. In one embodiment, the illustrated exemplary method 800A is described in relation to operations performed by the music manager server 310, as shown in FIG. 3A. As used herein, the term "music manager server" is used to connote a system that can manage the musical prefetching functionality for users. As such, so long as the functionality is provided, any name may be provided for "music manager server."

In operation 810A, an access to a music library is detected. The access to the music library may be conducted through a user device. For example, a user may use his or her user device to log into his or her music account in order to access the music library associated with this user music account. The music library may be managed in cloud music storage, for example, cloud music store 320 of cloud music storage 116, as shown in FIG. 3A. In one embodiment, the access is detected by user access module 317 of music manager server 310, as shown in FIG. 3A.

In operation 820A, the user device used to access the music library is identified to determine if the user device is a mobile device. In one embodiment, device identifier 314 may be utilized to identify whether the user device used to access the user music library is a mobile device. In one embodiment, whether a user device is a mobile device is identified through the connection speed between the user device and the music manager server that manages the music library of the user.

In operation 830A, the use activities for the user music account are monitored. In one embodiment, prefetching logic 312 may periodically pull the associated user record to monitor the recorded use activities for the user music account. The use activities of selected songs in the music library are adjustable for relevance based on dynamically assigned weightings. For example, the use activity "Purchase Time of a Song" may be assigned more weighting after the song has been purchased recently.

In one embodiment, prefetching logic 312 may be used to assign one or more weightings to the use activities of particular songs in the user music library and monitor the use activities of the songs. The assigned weightings may be dynamically adjusted by, for example, prefetching logic 312, if changes to the use activities have reached pre-determined thresholds. The changes to the use activities may be determined based on time, location of the user device, recent use activities changes, etc. In one embodiment, the use activities for a user music account are recorded in a use metrics portion of a user record that is associated with the user in user database 318.

Examples of use activities for a song stored in a user music account include, without limitation, number of times the song has been played, number of times the song appears in the playlists created by the user, last time the song was played, ratings of the song, current time of day, social network interactions for the song, purchase time for the song, similarity between the song and other songs in the music library, etc.

In operation 840A, one or more songs from the music library that satisfy a prefetching constraint are identified based on the monitored use activities, and the songs that satisfy the prefetching constraint are tagged for transferring to the mobile device. In one embodiment, prefetching logic 312 may be used to identify the songs that satisfy the prefetching constraint. The prefetching constraint may be measured by calculating a prefetching score for a song.

In operation 850A, the tagged songs that satisfy the prefetching constraint may be transferred to the mobile device. The transferring is initiated without receiving a user initiated request for the tagged songs. In one embodiment, prefetching logic 312 may be used to transfer the tagged songs to the identified mobile device via user access module 317.

In one embodiment, prefetching logic 312 may receive a parameter, e.g., the size of prefetch, which defines a song transferring threshold. The song transferring threshold may be set up by either the user or the digital music service provider. For example, prefetching logic 312 may not transmit any tagged songs until the number of the tagged songs reaches the song transferring threshold. Alternatively, prefetching logic 312 may start to transfer the tagged songs at the pre-defined time intervals, regardless the number of tagged songs.

Figure 8B:
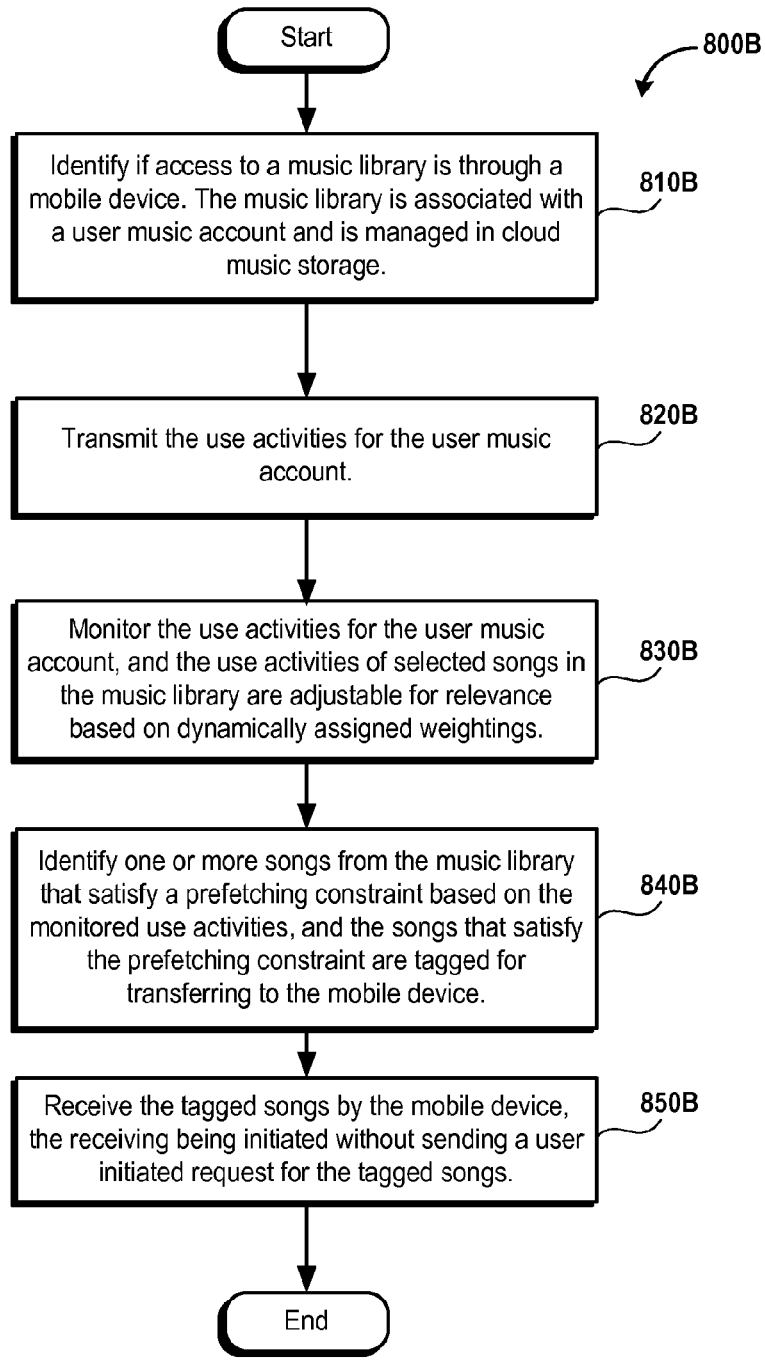
FIG. 8B illustrates a flow diagram of an exemplary method for prefetching music for mobile devices, in accordance with one embodiment of the present disclosure.

FIG. 8B illustrates a flow diagram of an exemplary method 800B for prefetching music for mobile devices, in accordance with one embodiment of the present disclosure. In one embodiment, the illustrated exemplary method 800B is described in relation to operations performed by the system 300B as shown in FIG. 3B. As shown in FIG. 3B, user device 360 includes communication logic 361, prefetching logic 363, a device identifier 364, a music buffer 365, and music logic 366.

In operation 810B, an access to a music library is identified to determine if the access is through a mobile device. The music library is associated with a user music account and the music library is managed in cloud music storage. In one embodiment, the access to the music library is conducted through user device 360. For example, device identifier 364 may identify user device 360 through the connection speed between music manager server 310' and user device 360. After device identifier 364 has determined that user device 360 is a mobile device, device identifier 364 may notify prefetching logic 363.

In operation 820B, the use activities for the user music account are transmitted. In one example, the use activities for user B music account 325 may be transmitted by music logic 366 via communication logic 361 of user device 360. The transmitted use activities may be received by music manager server 310' via user access module 317 to be saved in user B use metrics 315' of user B record 311' stored in user database 318.

In one embodiment, the use activities for a song in a user music account include, without limitation, number of times the song has been played, number of times the song appears in the playlists created by the user, last time the song was played, ratings of the song, current time of day, social network interactions for the song, purchase time for the song, similarity between the song and other songs in the music library, etc.

In operation 830B, the transmitted use activities are monitored and the use activities of selected songs in the music library are adjustable for relevance based on dynamically assigned weightings. In one embodiment, prefetching logic 363 may be used to assign one or more weightings to the use activities of particular songs in user B music library 326 of user B music account 325. The assigned weightings may be dynamically adjusted by, for example, prefetching logic 363, if changes to use activities have reached a pre-determined threshold. The changes to the use activities may be determined based on time, location of the user device, recent use activities changes, etc.

In operation 840B, one or more songs from the music library that satisfy a prefetching constraint based on the monitored use activities are identified. The songs that satisfy the prefetching constraint are tagged for transferring to the mobile device. In one embodiment, prefetching logic 363 may be used to identify the songs that satisfy the prefetching constraint by pulling user B use metrics 315' of user B record 311' stored in user database 318. In one embodiment, the prefetching constraint may be measured by calculating a prefetching score for a song.

In operation 850B, the tagged songs that satisfy the prefetching constraint may be received by the mobile device. The receiving is initiated without sending a user initiated request for the tagged songs. In one embodiment, music logic 366 may be used to receive the tagged songs and store the received tagged songs to music buffer 365.

In one embodiment, a user may set up a song transferring threshold from a user device such that no tagged songs are received by the user device unless the number of tagged songs has reached the song transferring threshold. Alternatively, the tagged songs are received by a user device at the pre-defined time intervals, regardless the number of tagged songs.

Figure 9:
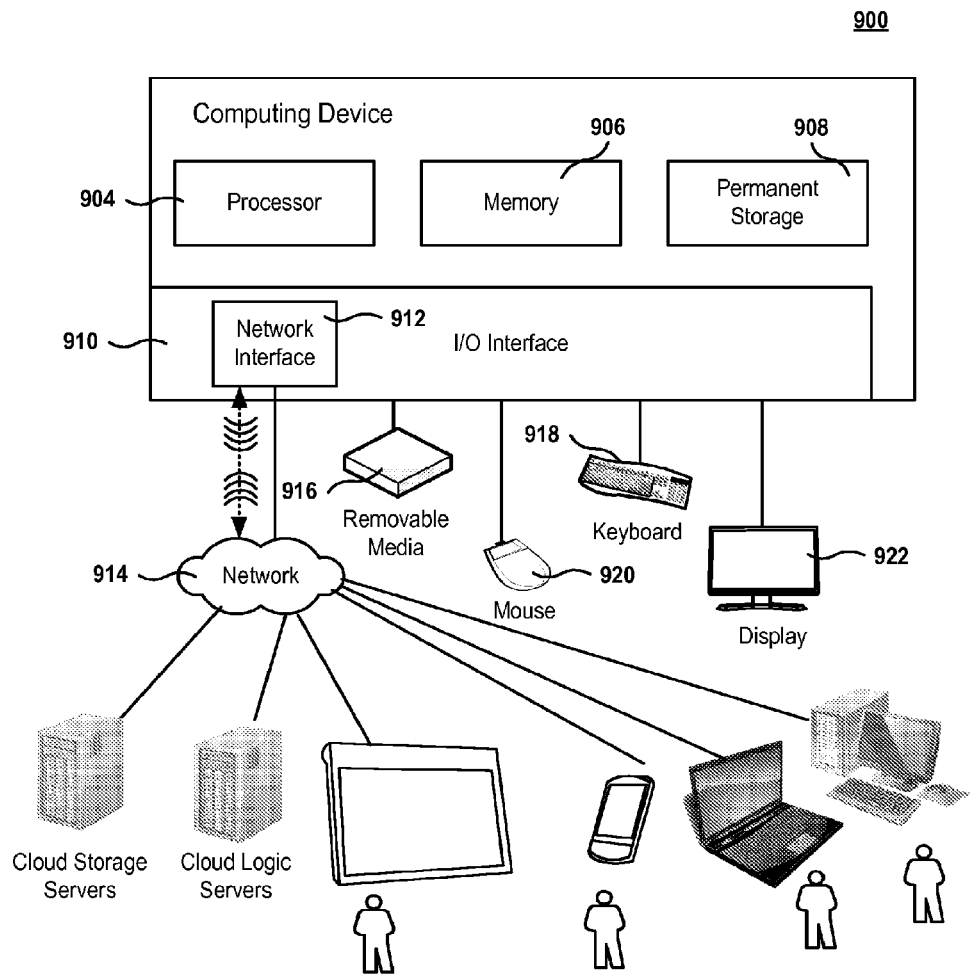
FIG. 9 is a simplified schematic diagram of a computer system for implementing embodiments of the present disclosure.

FIG. 9 is a simplified schematic diagram of a computer system 900 for implementing embodiments of the present disclosure. FIG. 9 depicts an exemplary computer environment for implementing embodiments of the disclosure. It should be appreciated that the methods described herein may be performed with a digital processing system, such as a general-purpose computer system. Special purpose computers, which are designed or programmed to perform only one function, may be used in the alternative. The computer system 900 includes a processor 904, which is coupled through a bus to memory 906, permanent storage 908, and Input/Output (I/O) interface 910.

Permanent storage 908 represents a persistent data storage device such as a hard drive or a USB drive, which may be local or remote. Network interface 912 provides connections via network 914, allowing communications (wired or wireless) with other devices. It should be appreciated that processor 904 may be embodied in a general-purpose processor, a special purpose processor, or a specially programmed logic device. Input/Output (I/O) interface 910 provides communication with different peripherals and is connected with processor 904, memory 906, and permanent storage 908, through the bus. Sample peripherals include display 922, keyboard 918, mouse 920, removable media device 916, etc.

Display 922 is configured to display the user interfaces described herein. Keyboard 918, mouse 920, removable media device 916, and other peripherals are coupled to I/O interface 910 in order to exchange information with processor 904. It should be appreciated that data to and from external devices may be communicated through I/O interface 910. Embodiments of the disclosure can also be practiced in distributed computing environments where tasks are performed by remote processing devices that are linked through a wired or a wireless network.

Embodiments of the present disclosure can be fabricated as computer readable code on a non-transitory computer readable storage medium. The non-transitory computer readable storage medium holds data which can be read by a computer system. Examples of the non-transitory computer readable storage medium include permanent storage 908, network attached storage (NAS), read-only memory or random-access memory in memory module 906, Compact Discs (CD), Blu-ray™ discs, flash drives, hard drives, magnetic tapes, and other data storage devices. The non-transitory computer readable storage medium may be distributed over a network-coupled computer system so that the computer readable code is stored and executed in a distributed fashion.

Additionally, FIG. 9 shows various types of devices that can connect to the network, such as the internet. The devices include servers, tablet computers, smartphones, laptops, desktops, etc. The various devices run operating systems and the operating systems can vary from manufacturer to manufacturer.

Some, or all operations of the method presented herein are executed through a processor, such as processor 904 of FIG. 9. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Embodiments presented herein recite a device or apparatus. The apparatus may be specially constructed for the required purpose or may be a general purpose computer. The apparatus includes a processor capable of executing the program instructions of the computer programs presented herein.

Although the foregoing embodiments have been described with a certain level of detail for purposes of clarity, it is noted that certain changes and modifications can be practiced within the scope of the appended claims. Accordingly, the provided embodiments are to be considered illustrative and not restrictive, not limited by the details presented herein, and may be modified within the scope and equivalents of the appended claims.

What is claimed is:

1. A method comprising:
   defining activity values for each of a plurality of use activities associated with digital music files that are stored in a server and associated with a user record, where the activity values are determined based on pre-defined rules;
   receiving a transmission of use data regarding recorded use activities of the digital music files associated with the user record;
   determining weighting values for each of the plurality of use activities based on the received use data;
   determining a pre-fetching constraint value;
   identifying digital music files that satisfy the pre-fetching constraint value based on the associated activity values and weighting values; and
   transferring the identified digital music files to a first device associated with the user record without receiving a user request for the identified digital music files.

2. The method of claim 1, wherein the pre-fetching constraint value is calculated to capture music files that the user is likely to play.

3. The method of claim 1, wherein the use data includes social interactions obtained from a social network that the user participates in.

4. The method of claim 3, wherein the social interactions include one or more interactions selected from the group consisting of: the user sharing the music file with social network friends, the user liking/disliking the music file on the social network, and the user's social network friends liking/disliking the music file on the social network.

5. The method of claim 1, wherein the plurality of use activities include one or more activities selected from the group consisting of: a number of times that the digital music file has been played, a number of times that the digital music file has appeared in any playlist created by the user, a last time that the digital music file was played, and a user rating of the digital music file.

6. The method of claim 1, wherein the activity values vary depending upon the type of use activity to which the respective activity value is associated.

7. The method of claim 1, wherein identifying the digital music files that satisfy the pre-fetching constraint comprises:
   calculating pre-fetching scores for digital music files associated with the user record, the pre-fetching scores being based on the respective activity values and weighting values of each digital music file; and
   analyzing the pre-fetching scores at pre-determined intervals to search for digital music files that have pre-fetching scores that satisfy the pre-fetching constraint.

8. The method of claim 1, wherein transferring the identified digital music files comprise:
   identifying whether the first device is a mobile device; and
   transferring the identified digital music files when the first device is identified as being a mobile device.

9. The method of claim 8, wherein the first device is identified as being a mobile device based on a transmission from a device identifier in the first device.

10. A system, comprising:
    a cloud storage server to store user records and digital music files that are associated with the user records;
    a user access module configured to receive a transmission of use data regarding use activities of the digital music files associated with the user records;
    a prefetching logic module configured to
       define activity values for each of a plurality of use activities associated with the digital music files, where the activity values are determined based on pre-defined rules,
       determine weighting values for each of the plurality of use activities based on the received use data,
       determine a pre-fetching constraint value,
       identify digital music files that satisfy the pre-fetching constraint value based on the associated activity values and weighting values, and
       transfer the identified digital music files to a first device associated with the user record without receiving a user request for the identified digital music files; and
    at least one processor configured to execute the user access module and the prefetching logic module.

11. The system of claim 10, wherein the pre-fetching constraint value is calculated to capture music files that the user is likely to play.

12. The system of claim 10, wherein the use data includes social interactions obtained from a social network that the user participates in.

13. The system of claim 12, wherein the social interactions include one or more interactions selected from the group consisting of: the user sharing the music file with social network friends, the user liking/disliking the music file on the social network, and the user's social network friends liking/disliking the music file on the social network.

14. The system of claim 10, wherein the plurality of use activities include one or more activities selected from the group consisting of: a number of times that the digital music file has been played, a number of times that the digital music file has appeared in any playlist created by the user, a last time that the digital music file was played, and a user rating of the digital music file.

15. The system of claim 10, wherein the activity values vary depending upon the type of use activity to which the respective activity value is associated.

16. The system of claim 10, wherein the prefetching log is further configured to identify the digital music files that satisfy the pre-fetching constraint by:
    calculating pre-fetching scores for digital music files associated with the user record, the pre-fetching scores being based on the respective activity values and weighting values of each digital music file; and
    analyzing the pre-fetching scores at pre-determined intervals to search for digital music files that have pre-fetching scores that satisfy the pre-fetching constraint.

* * * * *